United States Patent [19]
Kiefer

[11] 3,907,586
[45] Sept. 23, 1975

[54] GLASS ARTICLES HAVING A BROWN TO REDDISH-BROWN COLOR FROM BOROSILICATE GLASS OF A LOW THERMAL EXPANSION BY MEANS OF SILVER DIFFUSION DYE

[75] Inventor: Werner Kiefer, Mainz, Germany

[73] Assignee: Jenaer Glaswerk Schott & Gen., Mainz, Germany

[22] Filed: June 28, 1973

[21] Appl. No.: 374,629

[30] Foreign Application Priority Data
June 28, 1972 Germany.............................. 2231563

[52] U.S. Cl...................................... 106/54; 65/30
[51] Int. Cl.² ........................................... C03C 3/04
[58] Field of Search ..................... 106/54, 52; 65/30

[56] References Cited
UNITED STATES PATENTS

| 3,208,860 | 9/1965 | Armistead et al. .................... 106/54 |
| 3,419,370 | 12/1968 | Cramer............................. 106/54 X |
| 3,449,103 | 6/1969 | Stookey................................... 65/30 |
| 3,468,745 | 9/1969 | Navez et al. ......................... 65/30 X |
| 3,532,524 | 10/1970 | Petticrew.......................... 106/54 X |

Primary Examiner—Winston A. Douglas
Assistant Examiner—John F. Niebling
Attorney, Agent, or Firm—Millen, Raptes & White

[57] ABSTRACT

The silver diffusion dyeability of borosilicate glasses having a low thermal expansion coefficient and which are essentially free of arsenic and antimony is improved by adding 0.005–0.5 wt. % tin to a melt of the glass.

12 Claims, 1 Drawing Figure

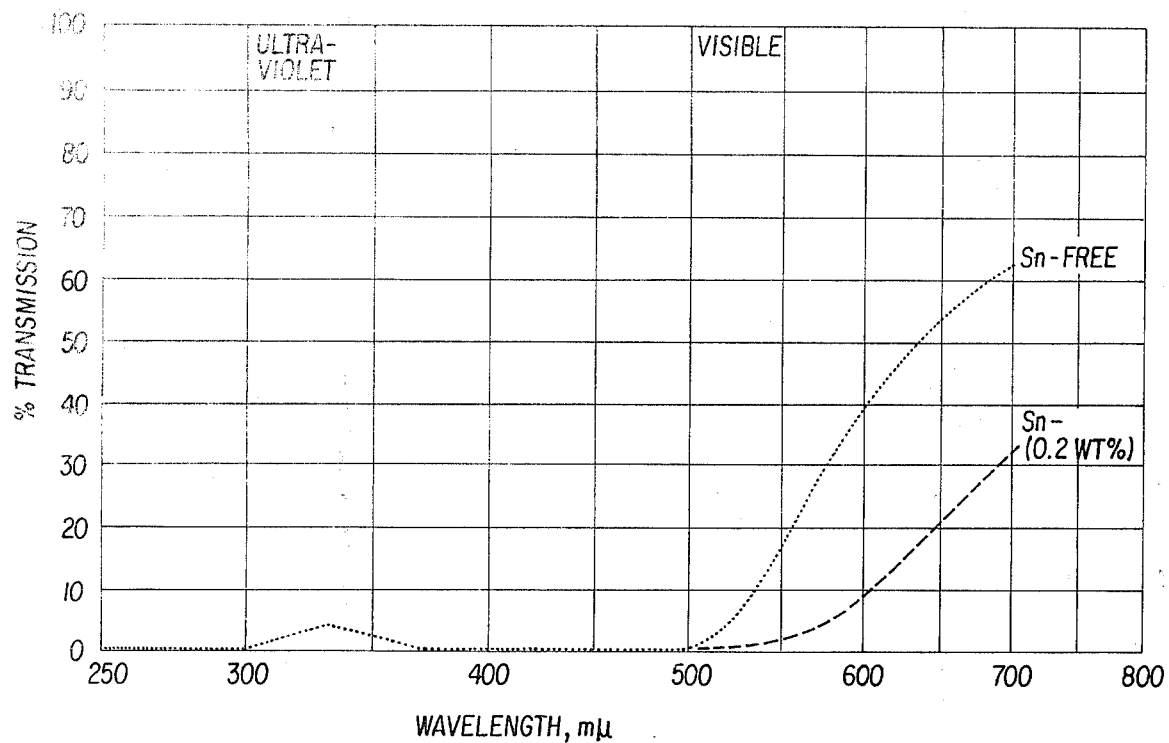

GLASS ARTICLES HAVING A BROWN TO REDDISH-BROWN COLOR FROM BOROSILICATE GLASS OF A LOW THERMAL EXPANSION BY MEANS OF SILVER DIFFUSION DYE

BACKGROUND

This invention relates to improving the dyeability of borosilicate glasses free of arsenic and antimony with a low thermal expansion coefficient $\alpha < 33.5 \cdot 10^{-7}$ cm $\cdot$ cm$^{-1} \cdot$ °C$^{-1}$ using silver diffusion dyes.

Borosilicate glasses are heat resistant silicate glasses containing at least 5 wt. % boric acid, e.g., Duran, Pyrex, etc. A typical composition of a borosilicate glass is, in wt. %, 80.5% $SiO_2$, 2.4% $Al_2O_3$, 12.9% $B_2O_3$, 3.8% $Na_2O$ and 0.4% $CaO$.

The coloring of glasses with silver diffusion dyes has been known since the 15th Century. In this method, a coloring paste or mordant containing copper and silver compounds as the coloring components is homogeneously applied to the area of the glass surface to be dyed. After the mordant has dried, the glass is heated in a normal atmosphere to a temperature somewhat above the upper cooling temperature, yet well below the softening point, e.g., 520°–600°C, and left at this temperature for about 1 hour. During the 1-hour tempering process, an ion exchange occurs between the alkali ions of the glass and the copper and silver ions of the mordant, together with reduction of the silver ions in the glass. Suitable coloring pastes generally contain 3–20% silver and 3–20% copper in the form of inorganic salts and/or oxides. Various suitable formulations are well known in the art, e.g., as sold by DEGUSSA, Frankfurt, Germany under the trade numbers 73017 and 76037, the contents of which are incorporated by reference herein.

The amount of exchanged copper and silver and their depth of penetration vary greatly depending on the composition of the glass to be colored. Glasses of a high boric acid content, e.g., over about 8%, are usually unsuitable for ion exchange reactions, so that only a relatively minor copper and silver exchange can be expected.

In addition to the ion exchange, a reduction of the silver ions to metallic silver also takes place during the tempering step. The color depth or chroma obtained with the silver diffusion dye also depends very much on the quantity and type of reducing agents present in the glass. Known reducing agents for the silver which diffuses into the glass are the refining agents $As_2O_3$ and $Sb_2O_3$ and FeO, which latter is present in most cases as an impurity. However, the borosilicate glasses preferred for laboratory glassware must not contain any $As_2O_3$ and $Sb_2O_3$ (less than 0.005% by weight each; see U.S. Federal Specification DD-G-541a of Feb. 17, 1953, page 1). For optical reasons, an increased FeO content, which would enhance the brown coloring, is likewise undesirable.

Therefore, only a yellowish-brown coloring can be produced on heretofore known borosilicate glasses having a thermal expansion coefficient $<33.5 \cdot 10^{-7}$ cm $\cdot$ cm$^{-1} \cdot$ °C$^{-1}$.

However, it is precisely these borosilicate glasses having a low thermal expansion which are being utilized to an ever increasing extent in the production of laboratory glassware and chemical utensils, due to their good stability to temperature changes and their excellent chemical resistance. For use as laboratory glassware and the like, these borosilicate glasses must also meet the requirement of being readily dyeable to a brown color, in order to provide protection against both UV light and visible light. Furthermore, the permanent coloring method has gained increasing importance as a means for marking and graduating glasses, since much laboratory glassware today is cleaned in automatic dishwashing machines and autoclaved, imposing very high requirements on the dyes with respect to chemical resistance and thermal stability. These requirements are especially well met by the diffusion dyes.

OBJECTS OF THE INVENTION

Accordingly, it is an object of the present invention to provide an improved process for the silver diffusion dyeing of borosilicate glass.

A further object of the present invention is to provide borosilicate glass compositions essentially free of arsenic and antimony which are susceptible to improved silver diffusion dyeing.

Another object of this invention is to provide silver diffusion dyed borosilicate glass having improved chemical resistance and thermal stability.

A more particular object of the present invention is to provide improved autoclavable brown borosilicate laboratory glassware.

Other objects and advantages of this invention will become apparent to those skilled in the art upon further study of the specification and appended claims.

SUMMARY OF THE INVENTION

Briefly, the above and other objects are attained in one aspect of the present invention by providing in a borosilicate glass having a thermal coefficient of expansion of less than $33.5 \times 10^{-7}$ cm $\cdot$ cm$^{-1} \cdot$ °C$^{-1}$, and characterized by being essentially free of arsenic oxide and antimony oxide, the improvement which comprises 0.005–0.5 wt. % tin uniformly dispersed therein by admixture to the melt phase of said glass.

BRIEF DESCRIPTION OF THE DRAWING

The above and other objects will become more fully apparent to those skilled in the art to which this invention pertains from the following detailed discussion, taken in conjunction with the annexed Drawing which illustrates the modified percent transmission curves obtained in accordance with the present invention.

DETAILED DISCUSSION

The present invention solves the problem of altering borosilicate glasses which are essentially free of arsenic and antimony and which have a thermal expansion coefficient of $<33.5 \cdot 10^{-7}$ cm $\cdot$ cm$^{-1} \cdot$ °C$^{-1}$ in such a way that they can be colored a brown to deep-brown color by means of customary diffusion dyes.

Suitable borosilicate glasses to which the present invention is applicable are those heat resistant silicate glasses which are well known in the art and are sold by JENA.er Glaswerk Schott & Gen., Mainz, Germany under the tradename "DURAN" or by CORNING GLASSWORKS, Corning, N.Y., under the tradename "PYREX".

In accordance with the invention, there is obtained on borosilicate glasses free of arsenic and antimony having a thermal expansion coefficient of $<33.5 \cdot 10^{-7}$ cm $\cdot$ cm$^{-1} \cdot$ °C$^{-1}$, with the aid of silver diffusion dye, a substantially deeper brown coloration, if 0.005 –0.5% by weight of tin (calculated as elemental Sn), preferably 0.05–0.2 %, is added to the glass melt. It has now been found that the color depth of the brown coloration is proportional to the amount of Sn added. No influence on coloration due to the oxidation state of Sn compound added was detected. Identical amounts of Sn, no matter in which form and in which state of oxidation they were added to the melt, e.g., in the form of zerovalent or metallic Sn, bivalent tin, e.g., SnO, or tetravalent tin, e.g., $SnO_2$, evoke the same tint. The addition of reducing agents in amounts sufficient to reduce the added tin, e.g., sugar and/or ammonium chloride, to the melt does not result in any further improvement of the color depth. Silver diffusion dyed borosilicate glasses of the present invention are not only darker in the visible spectrum than corresponding glasses lacking the added tin, but of equal importance exhibit essentially no ultraviolet transmission, thereby providing improved protection against photodegradation of chemicals stored in containers made therefrom.

It is known that $Na_2O$—CaO—$SiO_2$ glasses, to which silver is added in the melt, assume a yellow coloring. A stabilization of this color can be attained by adding 0.1–0.2% by weight of $SnO_2$. The effect of $SnO_2$ is based, in these glasses, on the increase in the solubility of the silver in the glass melt.

Yet, it is surprising to find that the addition of Sn to a melt of borosilicate glasses results in an improvement in the dyeability of these glasses, since the Sn introduced in the melt according to the process of this invention does not increase the solubility of the silver in the glass, but rather serves to reduce silver ions subsequently diffused into the glass to metallic silver, thus providing improved colloid formation and crystallization of the silver.

Without reducing agents such as $As_2O_3$ or $Sb_2O_3$, the low thermal expansion borosilicate glasses would have to be heattreated for about 1 hour or more at 30–70°C. above the glass transformation temperature ($\eta \sim 10^{13.5}$) with a silver diffusion dye in order to obtain a yellowish-brown to brown coloration. It is in this temperature range, however, that the low thermal expansion borosilicate glasses have a maximum phase separation, so that long heat treatment in this temperature range greatly reduces the chemical resistance of these borosilicate glasses.

By the addition of tin to the borosilicate glasses in accordance with this invention, it is now possible to conduct the heat treatment of the silver coloring below the temperature range of the strong phase separation, e.g., at the transformation temperature or 30°C above, so that there is no longer a reduction in the chemical resistance following heat treatment for the silver coloring.

By adding tin to $As_2O_3$ - and $Sb_2O_3$-free borosilicate glasses having low thermal expansion coefficients, it is now possible in accordance with the present invention to dye glass articles made from these glasses with the aid of the customary, chemically highly resistant silver diffusion dyes to an intense brown to reddish-brown coloring, and to mark them with letters, symbols and graduations.

Of great significance for the use of these glasses in the manufacture of chemical and laboratory apparatus is the fact that the glass utensils dyed in accordance with the claimed process have a markedly better absorption of both visible and UV light than similar glasses prepared by prior art processes. The upper curve in the figure represents the transmission curve of a tin-free "Duran 50" glass dyed with silver diffusion dye. In contrast thereto, the lower transmission curve was recorded in connection with a Duran 50 glass containing 0.2% by weight of tin, dyed under the same conditions. Duran 50 is a trademark of JENA.er Glaswerk SCHOTT & GEN., Mainz, Germany, for a borosilicate glass having approximately the following composition:

| | | |
|---|---|---|
| $SiO_2$ | 80.7 | % by weight |
| $B_2O_3$ | 72.8 | % by weight |
| $Na_2O$ | 3.7 | % by weight |
| $K_2O$ | 0.6 | % by weight |
| $Al_2O_3$ | 2.2 | % by weight |

Shaped glass articles prepared according to the present invention include those articles which can be prepared from borosilicate glass. Particularly useful is silver diffusion dying for graduating laboratory glassware, e.g. beakers, flasks, tubes and tubing, jars and bottles, funnels, carboys, reflux condensers, etc. Other suitable glassware is silver diffusion dyed containers for liquids susceptable to photodegradation, e.g., photographic chemicals, pharmaceuticals, organic chemicals, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Two borosilicate glasses of low thermal expansion coefficients having approximately the following composition (in percent by weight): 80.7% $SiO_2$, 12.80% $B_2O_3$, 3.70% $Na_2O$, 0.60% $K_2O$, 2.20% $Al_2O_3$, with and without 0.013% by weight of $SnO_2$ were melted in accordance with the methods customary for these glasses, as described, for instance, by W. Sack et al. in Glastechn. Ber. 43 (1970), H.8,S. 322–26. Respectively one glass sample of 2 × 10 × 20 mm. of each of the two glasses was sprayed on one side with a commercially available silver diffusion dye, such as Silver Diffusion Dye Nr. 73017 or 76037 sold by DEGUSSA, Frankfurt, Germany.

The sprayed samples were then dried at 100°C., and then heat-treated at 540°C. for 1 hour. The tin-containing glass sample exhibited a markedly darker brown coloration than the tin-free sample which was visible to the naked eye. No change could be determined in the hydrolytic stability of the glass caused by the heat treatment.

EXAMPLE 2

A glass having a composition corresponding to that of Example 1 was melted with 0.013% $SnO_2$, 0.30% $NH_4Cl$, and 0.10% sugar as tin reducing agents. The glass was melted and subsequently dyed with silver diffusion color analogously to Example 1. There was no color change as compared to the tin-containing glass sample in Example 1, indicating that the valence of the tin is not responsible for the improved color properties.

EXAMPLE 3

The basic glass composition of Example 1 received 0.01% metallic Sn as an additive, and the glass was melted and dyed with silver diffusion dye analogously to Example 1. No change in the tint was noticed as compared to the tin-containing glass sample in Example 1 to which $SnO_2$ had been added.

EXAMPLE 4

This experiment was conducted analogously to Example 3, with the difference that the basic glass composition was melted with 0.20% by weight of metallic tin instead of with 0.01% by weight. The glass sample, after the dyeing with silver diffusion dye, had a dark reddish-brown color. The Figure shows the transmission curve of this glass as compared to an otherwise identical tin-free glass dyed analogously.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a borosilicate glass having at least a portion thereof silver diffusion dyed to a brown to reddish brown color, having a thermal coefficient of expansion of less than $33.5 \times 10^{-7}$ cm · cm$^{-1}$ · °C$^{-1}$ and being essentially free of arsenic oxide and antimony oxide, the improvement which comprises 0.005–0.5 wt. % tin uniformly dispersed therein by admixture to the melt phase of said glass, whereby a substantially deeper brown to reddish brown color is obtained, the depth of color being proportional to the amount of tin added.

2. A borosilicate glass composition according to claim 1 wherein said tin is added to said melt in the zerovalent, bivalent or tetravalent state.

3. A borosilicate glass composition according to claim 2 wherein said tin is added as metallic tin, tin (II) oxide or tin (IV) oxide.

4. A borosilicate glass composition according to claim 3 wherein said tin is added as tin oxide.

5. A shaped object comprising a borosilicate glass composition according to claim 1.

6. A shaped object according to claim 5 in the form of an article of laboratory glassware.

7. A shaped object according to claim 5 in the form of a container for liquids.

8. A borosilicate glass composition according to claim 1 wherein the tin is present in a concentration of 0.05–0.2 wt. %.

9. A borosilicate glass composition according to claim 5 wherein the tin is present in a concentration of 0.05–0.2 wt. %.

10. A borosilicate glass composition according to claim 6 wherein the tin is present in a concentration of 0.05–0.2 wt. %.

11. A borosilicate glass composition according to claim 7 wherein the tin is present in a concentration of 0.05–0.2 wt. %.

12. A borosilicate glass composition according to claim 1 of the following wt. % composition:

| | |
|---|---|
| $SiO_2$ | 80.7 |
| $B_2O_3$ | 12.8 |
| $Na_2O$ | 3.7 |
| $K_2O$ | 0.6 |
| $Al_2O_3$ | 2.2 |
| Sn | 0.2 |

* * * * *